Patented Jan. 15, 1946

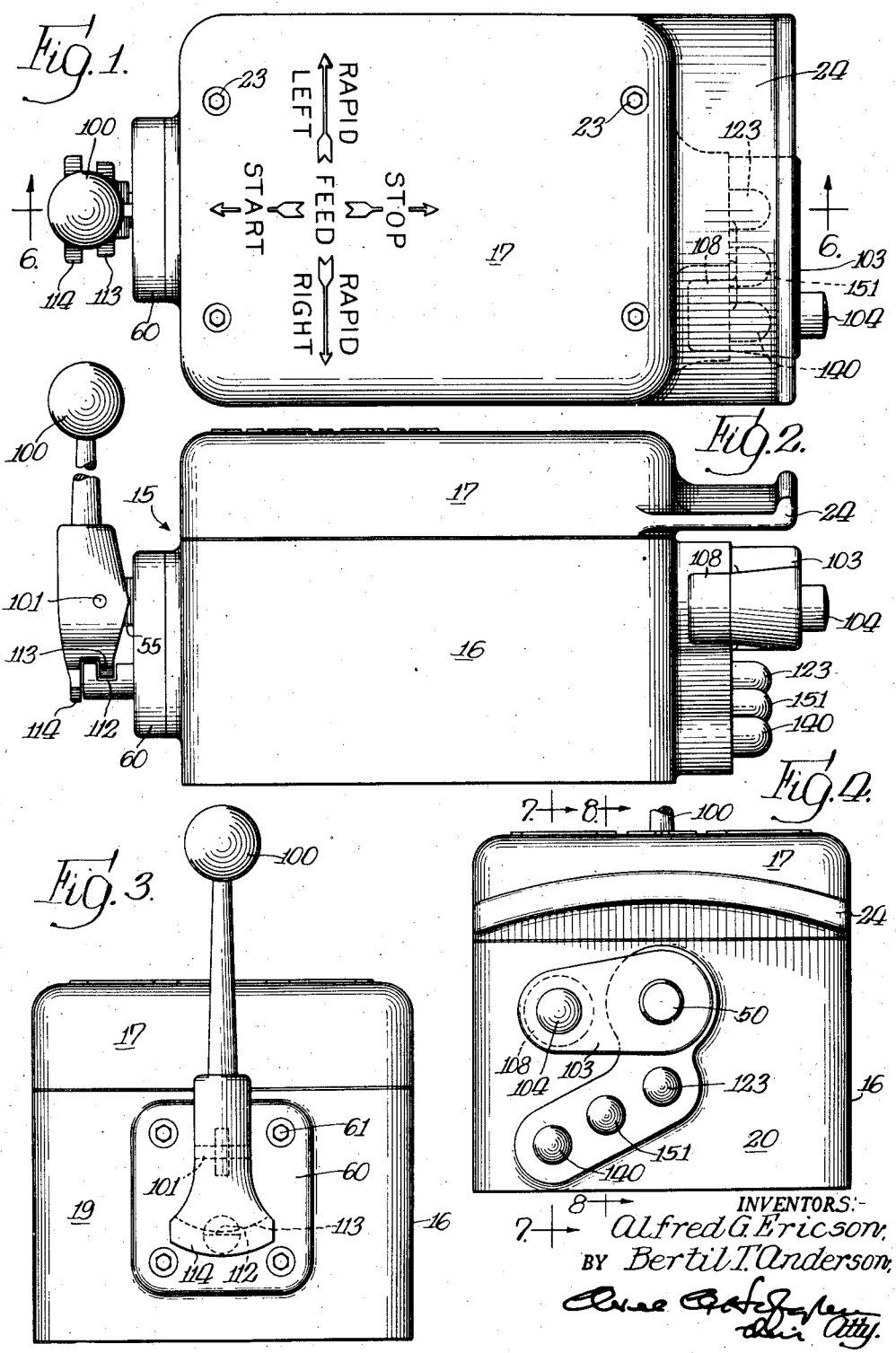

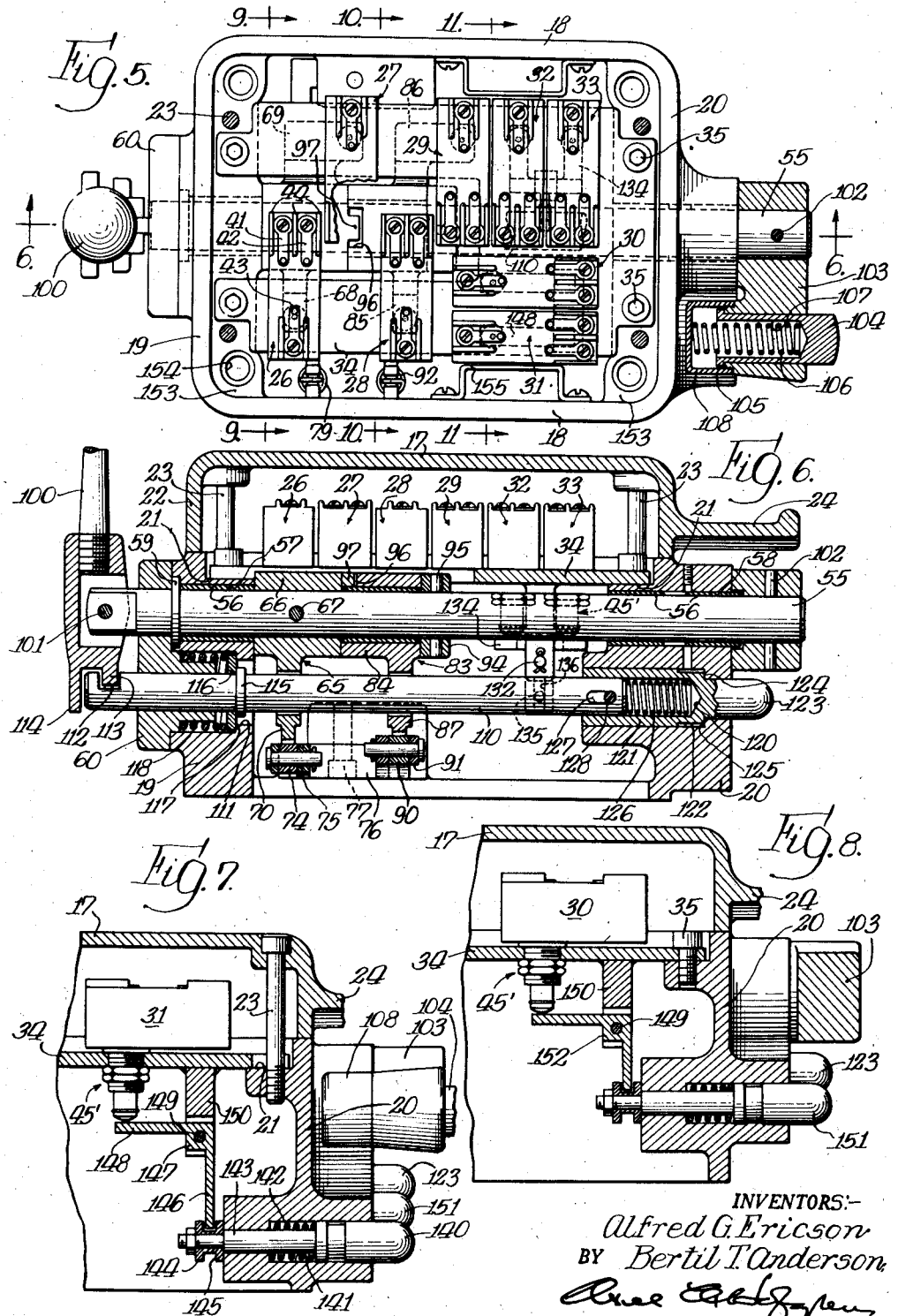

2,393,093

UNITED STATES PATENT OFFICE 2,393,093

UNITARY CONTROLLER

Alfred G. Ericson and Bertil T. Anderson, Rockford, Ill., assignors to Sundstrand Machine Tool Co., Rockford, Ill., a corporation of Illinois Application July 26, 1943, Serial No. 496,134

8 Claims. (Cl. 200—5)

The invention relates generally to a controller and more particularly to a unitary electrical controller especially adapted for use with machine tools and the like.

A general object of the invention is to provide a unitary electrical controller of new and improved construction.

A more particular object is to provide a controller of the character described having a construction resulting in precision in operation without requiring high precision in manufacture, permitting the controller to be quickly and economically manufactured and assembled.

Another object is to provide an electrical controller that is readily wired and serviced, all switches being located at the top of the controller unit which they are exposed by simple removal of a cover.

Another object is to provide a unitary electrical controller having a main casing supporting and housing switch actuating mechanism, and a plurality of unit switches removably mounted on a plate in turn removably mounted at the top of the main casing, the engagement between the switches and the actuating mechanism permitting removal or replacement of the plate and the switches as a unit.

Other objects and advantages will become apparent from the following detailed description taken in connection with the accompanying drawings, in which:

Fig. 1 is a top plan view of a controller embodying the features of this invention.

Fig. 2 is a side elevational view of the controller shown in Fig. 1.

Fig. 3 is an end elevational view taken from the left in Fig. 1.

Fig. 4 is an end elevational view taken from the right in Fig. 1.

Fig. 5 is a plan view of the controller of Fig. 1 with the cover removed and with one operating element in section.

Fig. 6 is a vertical sectional view taken approximately along the line 6—6 of Figs. 1 and 5.

Fig. 7 is a fragmentary vertical sectional view taken approximately along the line 7—7 of Fig. 4.

Fig. 8 is a fragmentary vertical sectional view taken approximately along the line 8—8 of Fig. 4.

Figure 9:
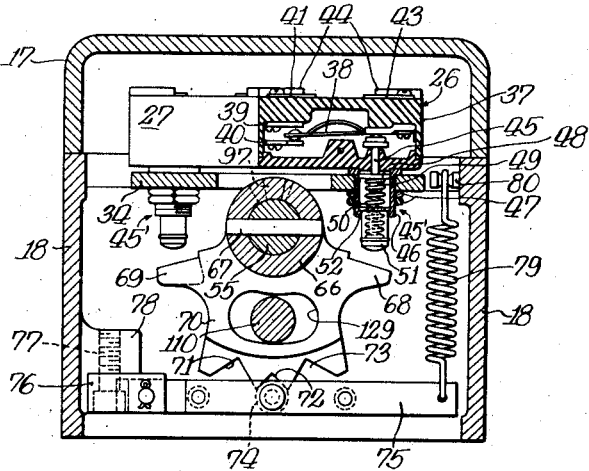
Fig. 9 is a transverse sectional view taken approximately along the line 9—9 of Fig. 5.
Figure 10:
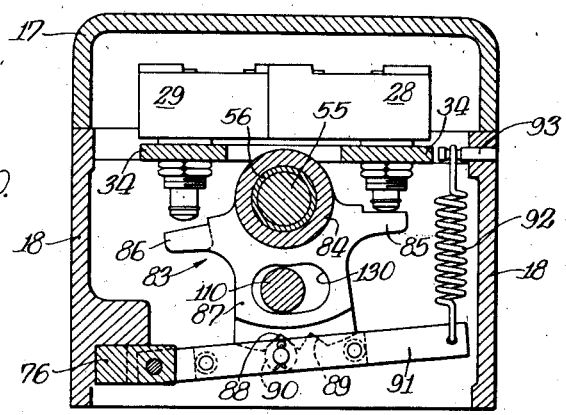
Fig. 10 is a transverse sectional view taken approximately along the line 10—10 of Fig. 5.

While the invention is susceptible of various modifications and alternative constructions, it is shown in the drawings and will hereinafter be described in a preferred embodiment. It is not intended, however, to be limited to the specific disclosure shown, but on the contrary it is intended to cover all modifications and alternative constructions falling within the spirit and scope of the invention as defined by the appended claims.

As shown in the drawings for purposes of disclosure, the controller comprises a casing, generally designated 15, having a main bottom or base portion 16 and a closure 17. The main portion 16 of the casing is generally rectangular with side walls 18 of normal thickness and end walls 19 and 20, which will hereinafter be referred to as front and rear end walls, respectively, of substantially thickness or at least formed with thickened portions, as best seen in Figs. 6 to 8. The main casing portion 16 is open at the bottom and at the top with end walls cut back to form shoulders 21. The closure 17 is also rectangular and formed with a peripheral flange 22 of some considerable width so as to give depth to the closure, permitting portions of the controller mechanism to project thereinto. The flange 22 registers with the end and side walls of the main casing portion 16 and the closure is removably secured by means of bolts 23 extending through suitable recesses and apertures formed in the closure and into threaded engagement with the end walls 19 and 20 of the main casing portion. At its rear end the closure is formed with a projecting lip or apron 24 to provide a protecting shield for certain operating elements located therebeneath, as will shortly be described.

It is a feature of this invention that the sturdy, substantially trouble-free, mechanical switch actuating mechanisms are housed in the somewhat less accessible, main casing portion 16, while the less sturdy electrical portions of the controller are located at the top of the main casing portion partially within the closure 17 to be readily accessible upon removal of the closure. To that end, there is provided herein a plurality of switches 26, 27, 28, 29, 30, 31, 32 and 33 of identical construction mounted on a U-shaped plate 34 removably secured, as by bolts 35, upon the shoulders 21. Each switch, as best seen in Fig. 9, is a "micro" switch disclosed and claimed in U. S. Letters Patent No. 1,960,020. Suffice it to say, therefore, that each switch comprises a two-part casing 37 housing therein a movable leaf spring contact 38 and a pair of stationary contacts 39 and 40 disposed on opposite sides of the free end of the movable contact. The contacts 39 and 40 are brought out (see Fig. 5) to terminals 41 and 42 on the top, exterior side of the casing 37. The movable leaf spring contact 38 is anchored at one end to the casing 37 and is brought out to a terminal 43 on the top surface of the casing 37. The terminals 41 to 43 are preferably separated by small ribs or beads 44 to aid in preventing short circuiting of the wires that are connected thereto. The movable contact 38 is normally biased into engagement with the contact 40 and is moved out of engagement with the contact 40 and into engagement with the contact 39 by means of a pin 45 extending outwardly of the casing 37 through what is the bottom wall thereof, as viewed in Fig. 9.

To adapt the switch for use in this invention, it is provided with adapter means, generally designated 45', forming a combined attaching means and yieldable extension of the pin 45. This structure comprises a tube 46 secured to the bottom wall of the casing 37 in surrounding relation to the pin 45. The tube 46 is externally threaded to receive a pair of nuts 47 by means of which the tube and hence the switch are securely retained in position carried by the U-shaped plate 34, after having first been passed through an aperture formed in the plate for the passage of the tube. Slidable in the inner end of the tube and abutting the projecting end of the pin 45 is a disk 48 having a central stud 49 for centering one end of a compression spring 50. The other end of the spring bears against the closed end of a thimble 51 which is slidable in the tube 46 and which is retained against loss through the outer end of the tube 46 by an inturned flange 52. The dimension of the spring and of the tube and thimble are such, in the position shown in Fig. 9, that the movable contact 38 engages the stationary contact 40. Slight upward movement of the thimble 51 acting through the spring 50 and disk 48 moves the pin 45 to break the connection between the contacts 38 and 40, and to make the same between the contacts 38 and 39, the strength of the spring being sufficient to overcome the bias of the movable contact 38. Spring 50, however, compresses to permit an over travel of the switch actuating means without injury to the switch proper.

The number and location of switches may, of course, vary to adapt the controller for different installations. Herein, as already indicated, eight switches 26, 27, 28, 29, 30, 31, 32 and 33 are provided, and these are arranged with the switches 26 and 27, 28 and 29, and 32 and 33 as functional pairs, the switches of the first two pairs being disposed on opposite sides of the longitudinal center line of the controller and offset longitudinally of the controller by approximately the width of a switch, while the last named pair are disposed parallel with one another, all as best seen in Fig. 5. The switches 30 and 31 are functionally individual, and are disposed parallel with one another extending longitudinally of the casing, as distinguished from transversely, as are all of the other switches.

As above stated, the actuating means for the switches is housed within the main portion 15 of the casing with operated elements projecting outwardly of the casing. The actuating means comprises a shaft 55 extending longitudinally of the casing. The shaft is journaled near its ends in the end walls 19 and 20 of the main portion 16 of the casing and projects outwardly beyond each end wall. Preferably bushings 56 of suitable material are interposed between the shaft and the bores 57 and 58 in the end walls 19 and 20, respectively, and at its front end the shaft 55 is formed with a radial flange 59 which is received in an enlargement of the bore 57. Retaining the flange in the enlargement of the bore 57 so as to hold the shaft 55 in fixed longitudinal position, while permitting oscillation thereof, is a cap 60 removably secured to the front end wall 19 by bolts 61.

Carried by the shaft 55 is an actuating element 65 for the switches 26 and 27. The element comprises a hub 66 of substantial axial width and is non-rotatably secured to the shaft by means of a pin 67 extending diametrically through the hub and the shaft. Extending laterally to the right, as viewed in Fig. 9, is an arm 68 disposed in a plane vertically beneath the pin 45 of the switch 26, while extending laterally to the left and rearwardly is an arm 69 terminating vertically beneath the pin of the switch 27. Extending downwardly from the hub is a star wheel forming portion 70 having its periphery formed with three notches 71, 72 and 73. Adapted to cooperate with the notches is a roller 74 carried by a bar 75 pivotally mounted at one end on a block 76 removably secured, as by bolts 77, to a shelf 78 projecting inwardly from one side wall of the main casing portion. Connected to the other end of the bar 75 is one end of a tension spring 79 anchored at the other end on a pin 80 projecting from the side wall of the casing portion 16. It will be seen, especially from Fig. 9, that the element 65 has three positions, namely, a neutral position, as shown, wherein the roller 74 engages the intermediate notch 72, and extreme positions on either side of neutral in which the roller 74 engages the notches 71 and 73, respectively. As clearly seen from Fig. 9, when the element is in its neutral position neither the arm 68 nor the arm 69 engages the adapter, and hence the switches 26 and 27 remain in their normal, non-actuated position. When the element 65 is in either extreme position, however, one switch will be actuated, while the other will remain in normal position, depending upon the direction in which the shaft 55 is rocked.

For actuation of the switches 28 and 29, an element, generally designated 83, similar to the element 65, is provided. This element has a hub 84 and projecting laterally from the hub are arms 85 and 86, with the arm 86 again also projecting rearwardly to underlie the adapter means for the switch 29. A star wheel portion 87 extends downwardly from the hub and has a pair of notches 88 and 89 formed in its periphery. Cooperating with the notches to retain the element 83 yieldably in one or the other of its two positions is a roller 90 carried by a bar 91 pivotally mounted at one end on the block 76. The other end has secured thereto one end of a tension spring 92, the other end of which is anchored on a pin 93 projecting inwardly from the side wall of the main casing portion 16. This element is rotatable relative to the shaft 55 and is retained with its hub in abutting relation to the hub 66 by means of a collar 94 retained by a pin 95. The element 83 is driven from the shaft 55 through the element 65 in a manner such that it is actuated whenever the element 65 is moved to an extreme position, but remains unactuated while the element 65 returns from either extreme position to neutral. To that end, the hub 84 is, as best seen in Fig. 5, formed with a notch 96, while the hub 66 is formed with a tongue 97 projecting into the notch. The notch 96 is sufficiently wider than the tongue 97 to provide a lost motion connection bringing about the operation above described.

The shaft 55, and hence the switches 26 to 29, is adapted for actuation either manually under the control of an operator or automatically by means such as dogs on a machine with which the controller is associated. To that end, there is mounted on the front end of the shaft 55 a manual actuating handle 100. This handle is secured to the end of the shaft by means of a pin 101 extending diametrically through the shaft so as to be non-rotatable relative thereto, but at the same time pivotal in one plane of the shaft. At its rear end the shaft 55 has non-rotatably fixed thereto, as by a pin 102, an arm 103 carrying a follower 104. Preferably this follower is axially yieldable and to that end is slidably mounted in the arm 103, being limited against excessive outward movement by a radially outwardly projecting flange 105, and being urged yieldably to projecting position by a compression spring 106 received at one end in a recess 107 formed in the follower 104, and bearing at the other end against a cap 108 threaded onto the arm 103 in surrounding relation to the flanged end of the follower 104.

Extending longitudinally of the casing parallel with and vertically beneath the shaft 55 is a rod 110 projecting at its front end outwardly through a stepped bore 111, formed in the front end wall 19, and through the end cap 60. At its projecting end the rod is formed with a notch 112 into which projects an arcuate lip 113 formed on the handle 100. To protect the end of the rod, the handle 100 is formed with a second, longer lip 114 which projects downwardly to cover the end of the rod 110. Inwardly of the notch 112, there is formed on the rod 110 a radially outwardly projecting flange 115, and immediately adjacent this flange, outwardly of it, is a washer 116 large enough to engage an annular shoulder 117 formed in the stepped bore 111. A compression spring 118 surrounds the rod 110 and bears at one end against the cap 60 and at the other end against the washer 116 to urge the rod 110 rearwardly until limited by the shoulder 117, as in Fig. 6. The remaining or rear end of the rod 110 is slidably received within a bore 120 formed in a plunger 121 longitudinally slidable in a bore 122 in the rear end wall 20. The plunger has a reduced and rounded portion 123 projecting outwardly through the rear wall 20 for engagement and actuation by suitable means, such as dogs, on a machine with which the controller is associated. The reduced portion 123 leaves an annular shoulder 124 on the plunger which abuts a shoulder 125 formed by the bore 22 to limit outward movement of the plunger under the influence of a compression spring 126 interposed in the bore 120 in the plunger between the end of the rod 110 and the end of the bore. Preferably a limited lost motion connection is formed between the plunger and the rod. To that end, the rod is formed with an elongated slot 127 and projecting through this slot is a pin 128 carried by the plunger 121. Thus it will be seen that the rod 110 may be shifted rearwardly by the handle 100 even though the plunger is already abutting the shoulder 125, and that, conversely, the plunger 121 may be operated and either shift the rod 110 forwardly through the compression spring 126, or may leave the rod 110 unshifted if shift is opposed by a force sufficiently great to overcome the spring 126. Arcuate slots 129 and 130 through which the rod 110 projects are formed respectively in the elements 65 and 83 to accommodate the rod.

Figure 11:
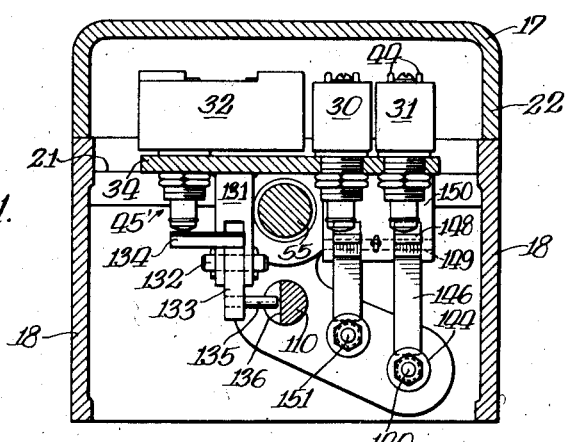
Fig. 11 is a transverse sectional view taken approximately along the line 11—11 of Fig. 5.

Rod 110 governs actuation of the switches 32 and 33. To that end, there depends downwardly from the plate 34 a block 131 terminating in a bifurcated end, and pivotally mounted in the bifurcated end of the block 131 on a pin 132 is a lever 133 carrying on its upper end, as best seen in Figs. 5 and 11, a horizontally disposed, U-shaped member 134, the legs of which extend laterally outwardly to underlie the adapters 45' of the switches 32 and 33. In normal position, the lever 133 does not actuate either of the switches 32 and 33, but upon slight pivoting will actuate one or the other, depending upon the direction in which the lever 133 is swung. Projecting laterally inwardly from the lower end of the lever 133 is a pin 135 adapted to engage in suitable means formed in the rod 110 so that the lever will be rocked as the rod is moved axially. In order to enable ready assembly or disassembly of the controller and, particularly, to enable the plate 34 together with the switches and the portions of the switch actuating means carried thereby to be removed as a unit, the means with which the pin 135 engages is formed as a slot 136 in the side of the rod 110 and opening upwardly, so that engagement or disengagement of the pin with the rod is easily effected as an incident to the vertical removal or replacement of the plate 34.

Switch 31 is herein controlled by an operating element in the form of a plunger 140 projecting from a bore 141 formed in the rear wall 20 of the casing. The plunger is urged outwardly by a compression spring 142 bearing at one end against the bottom of the bore 141 and at the other end against the plunger 140, the spring being in surrounding relation to a stem 143 of the plunger which projects inwardly through the rear end wall 20. At this inner end the stem 143 has a reduced portion carrying a collar 144 limiting the outward movement of the plunger 140. The collar 144 has an annular groove 145 formed therein for the reception of the end of one arm 146 of a right-angle lever 147, the other arm 148 of which is disposed beneath the adapter means 45' of the switch 31. The lever 147 is pivotally mounted by means of a pin 149 between bifurcations of a block 150 depending from the plate 34. It will be seen that here again the arm 146 of the lever 147 is engaged or disengaged from the plunger 140 as an incident to vertical removal or replacement of the plate 34. Switch 30 is under the control of an operating element again in the form of a plunger 151 acting through a right-angle lever 152 with both the plunger and the lever identical in construction with the plunger 140 and the lever 147. As best seen in Fig. 4, the plungers 140, 151 and 123 are disposed at various levels and, of course, at different points laterally of the casing, so as to adapt them for operation by suitable means such as dogs on a machine with which the controller is associated.

To facilitate mounting of the controller directly on the bed of the machine, as is the customary practice, the corners of the base portion 16 of the casing are formed with fillets 153 having holes 154 drilled therethrough for the passage of bolts securing the controller to the machine. Secured to each of the side walls 18 is a vertically extending channel member 155 forming a conduit or passage for the wires connected to the various switches. Just as the number and arrangement of switches may be varied, so also may the function of the various switches be varied. However, it might be stated that when employed, for example, with a machine tool the switches 32 and 33 are connected to act as start and stop switches, and it will be understood that these may be manually actuated through pivoting of the handle 100 about its pin 101. One of these switches will also be under the control of the plunger 121. The switches 26 to 29 usually determine direction of operation of some element and rate of operation, that is, feed or traverse. The switches 30 and 31 may have a variety of functions including the producing of different rates of feed speed, or possibly limit switches, or some other function well known to those skilled in the art.

It will be apparent from the foregoing that we have perfected a unique, unitary controller providing a construction which is precise and accurate in operation without requiring high precision in manufacture, thereby enabling the unit to be more economically manufactured and assembled. The controller has also been designed with a view to enhancing ease of assembly and above all servicing. It will be seen that herein the electrical parts, which are more inclined to require servicing than the sturdy mechanical parts, are housed at the top of the casing where they are quickly and completely exposed simply by removal of the closure 17. Moreover, the construction is such that the switches and portions of the actuating means therefore may be assembled on the plate 34 as a unit and then installed in the casing as a unit with the actuating means carried by the plate operatively engaging the rod 110 or the appropriate plungers as an incident to vertical movement of the plate into position.

We claim as our invention:

1. A controller comprising, in combination, a casing having a main portion opening upwardly and a closure therefor, a plate removably mounted near the top of said main portion, a plurality of switches mounted on the upper side of said plate for exposure and ready access upon removal of said closure, each of said switches having a casing, terminals on the top of said last named casing, an actuating pin projecting out of said casing, a tube rigid with the switch casing in surrounding relation to said pin and extending through said plate for securing said switch and yieldable means carried by said tube for actuating said pin, and actuating means for said switches housed in said main casing portion and having operating elements extending outwardly of the casing.

2. A controller comprising, in combination, a casing having a main portion opening upwardly and a closure therefor, a plate removably mounted near the top of said main portion, a plurality of switches mounted on the upper side of said plate for exposure and ready access upon removal of said closure, each of said switches having adapter means terminating beneath said plate, actuating levers for certain of said switches pivotally mounted on the under side of said plate, and operating elements extending outwardly of said main casing portion adapted to be operatively coupled with or uncoupled from said levers by insertion or withdrawal of said plate.

3. A controller comprising, in combination, a casing having a main portion opening upwardly and a closure therefor, a plate removably mounted near the top of said main portion, a plurality of switches mounted on the upper side of said plate for exposure and ready access upon removal of said closure, each of said switches having adapter means terminating beneath said plate, a lever pivotally mounted underneath said plate having laterally projecting arms for alternate engagement with the adapter means for two of said switches and a pin, a rod extending longitudinally of the main portion of said casing and mounted for axial movement, said rod having a groove for the reception of the pin on said lever as an incident to mounting of said plate, and means externally of said casing for shifting said rod axially.

4. A controller comprising, in combination, a casing having a main portion opening upwardly and a closure therefor, a plate removably mounted near the top of said main portion, a plurality of switches mounted on the upper side of said plate for exposure and ready access upon removal of said closure, each of said switches having adapter means terminating beneath said plate, a pair of right angle levers each pivotally supported from the underneath side of said plate to have a generally horizontally and a generally vertically extending arm, said horizontal arm terminating opposite an adapter means for a switch, a plunger for each of said levers projecting outwardly of said casing, and a collar fixed on the inner end of said plunger having a groove therein for reception of the free end of the vertical arm of the lever as an incident to placing of said plate in position on said main casing portion.

5. In a controller, a casing, a plurality of switches mounted within said casing and actuating means for certain of said switches including an axially movable rod extending longitudinally of said casing and projecting at one end therefrom, a lever engaging the projecting end of said rod for actuating the same in either direction axially, spring means urging said rod in one direction to a normal position, a plunger having a lost motion connection with the remaining end of said rod and projecting outwardly of said casing, and a compression spring interposed between said rod and said plunger.

6. A controller comprising, in combination, a casing, a plurality of switches of the leaf element type mounted within said casing, actuating means for said switches housed within said casing including operating elements extending outwardly of said casing, and yieldable means interposed between each of said switches and said actuating means for permitting movement of said actuating means beyond that required to actuate said switches.

7. In a controller, a casing, a plurality of switches mounted within said casing and actuating means for certain of said switches including an axially movable rod extending longitudinally of said casing and projecting at one end therefrom, a lever directly engaging the projecting end of said rod for actuating the same positively in either direction axially, a plunger projecting from said casing through the end opposite said lever and having the remaining end of said rod received slidably therein, and a compression spring interposed between said rod and said plunger adapting said plunger to actuate said rod impositively in one direction only.

8. In a controller, a casing, a plurality of switches mounted within said casing and actuating means for certain of said switches including an axially movable rod extending longitudinally of said casing and projecting at one end therefrom, a lever directly engaging the projecting end of said rod for actuating the same positively in either direction axially, limitedly operable spring means urging said rod in one direction to a normal position, a plunger having a portion projecting outwardly of said casing through the end thereof opposite said lever, cooperating means on the plunger and the end wall limiting outward movement of the plunger, a compression spring interposed between said rod and said plunger urging said rod in a direction opposite to said first mentioned spring means, and a limited lost motion connection between said plunger and said rod, said plunger and said rod when in normal position permitting relative movement of said plunger and said rod toward one another to the limit of the lost motion means.

ALFRED G. ERICSON.
BERTIL T. ANDERSON.